Dec. 6, 1949   W. J. HUGHES   2,490,439
FEEDER FOR PULVERANT MATERIAL WITH A VERTICALLY
RECIPROCABLE BELT CONVEYER
Filed June 29, 1944   3 Sheets-Sheet 1
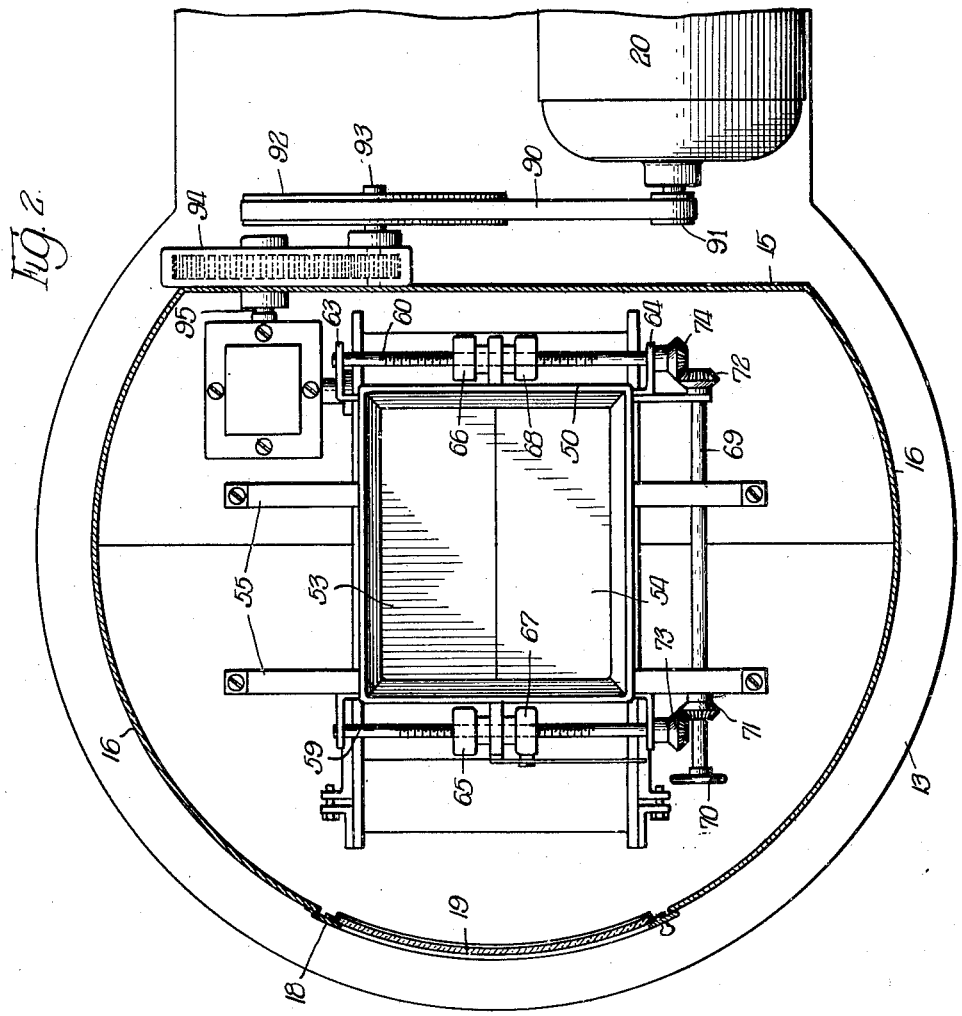
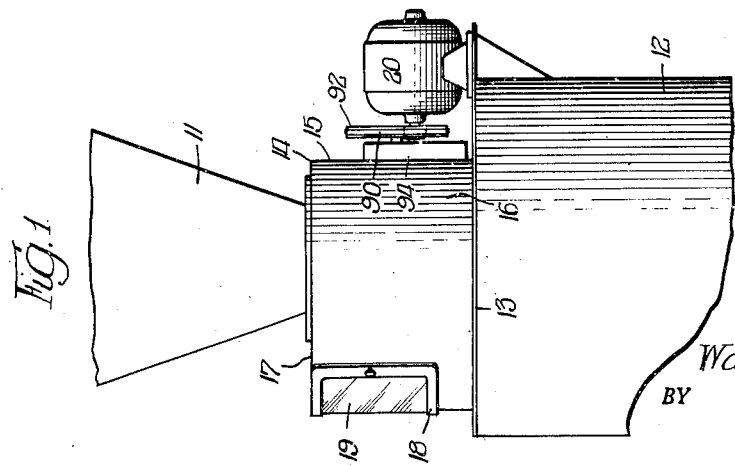
INVENTOR.
Walter J. Hughes,
BY
Robyn Hilcox
ATTY.

Dec. 6, 1949 W. J. HUGHES 2,490,439
FEEDER FOR PULVERANT MATERIAL WITH A VERTICALLY
RECIPROCABLE BELT CONVEYER
Filed June 29, 1944 3 Sheets-Sheet 2
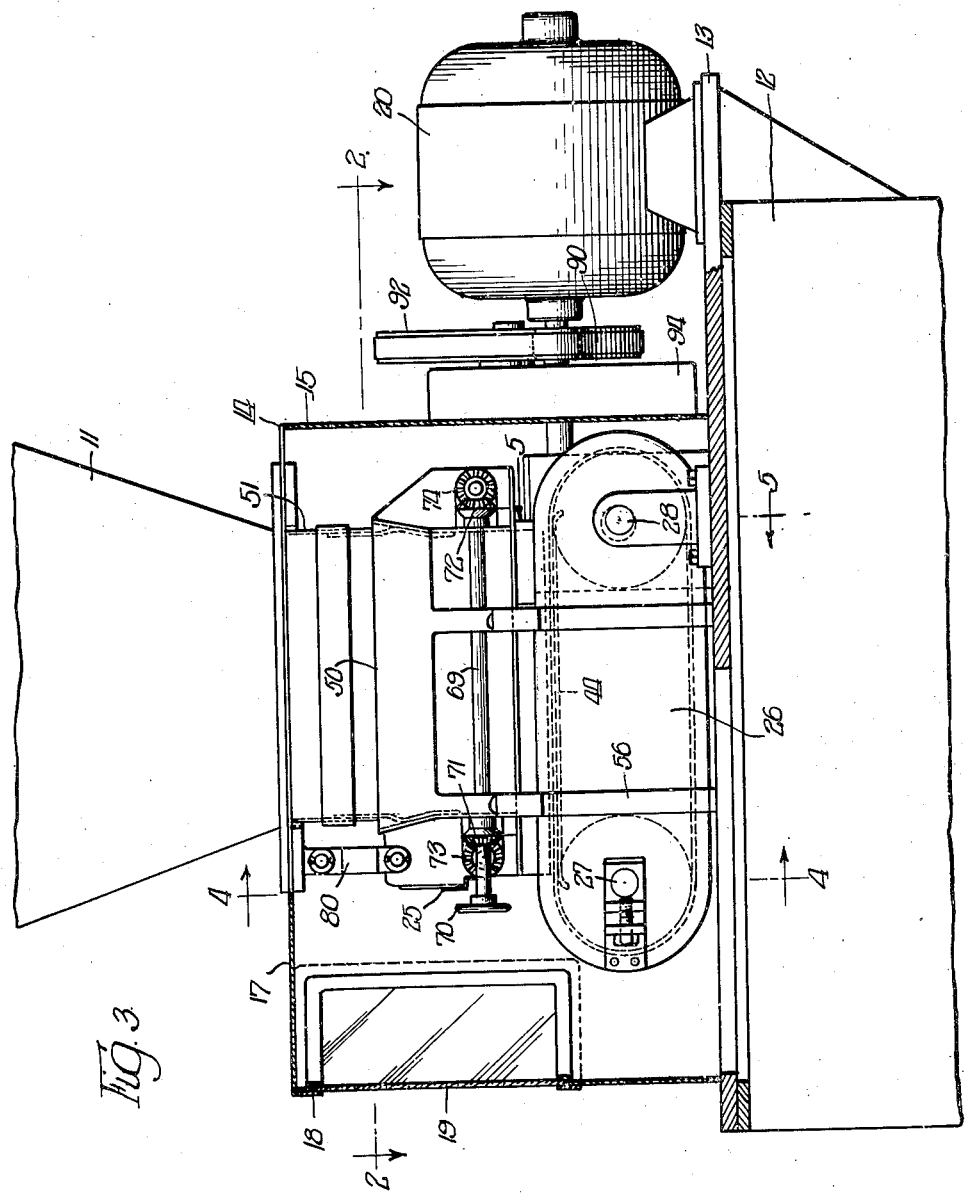
INVENTOR.
Walter J. Hughes,
BY Robyn Wilcox
atty.

Dec. 6, 1949 W. J. HUGHES 2,490,439
FEEDER FOR PULVERANT MATERIAL WITH A VERTICALLY
RECIPROCABLE BELT CONVEYER
Filed June 29, 1944 3 Sheets-Sheet 3
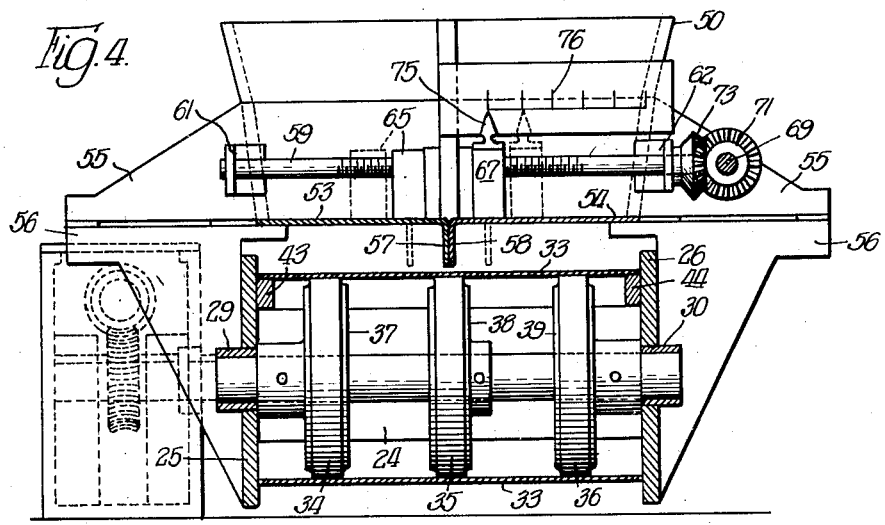
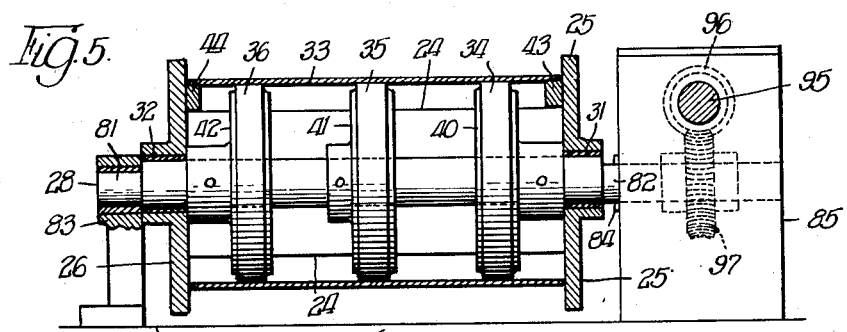
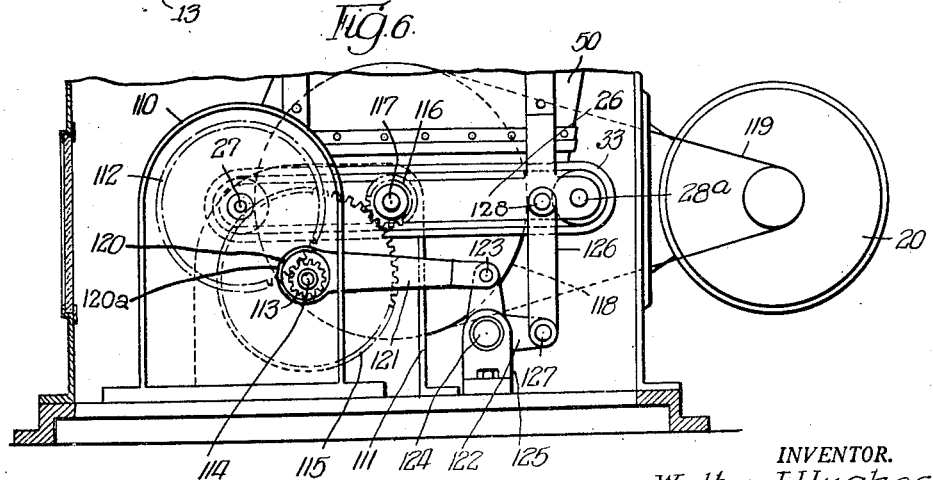
INVENTOR.
Walter J. Hughes,
BY
Robyn Wilcox
Atty.

Patented Dec. 6, 1949

2,490,439

UNITED STATES PATENT OFFICE 2,490,439

FEEDER FOR PULVERANT MATERIAL WITH A VERTICALLY RECIPROCABLE BELT CONVEYER

Walter J. Hughes, Chicago, Ill., assignor to Infilco Incorporated, Chicago, Ill., a corporation of Delaware Application June 29, 1944, Serial No. 542,727

11 Claims. (Cl. 222—199)

This invention relates to a feeder for delivering dry pulverized material at a predetermined rate.

One of the objects of the present invention is to provide an improved belt feeder for dry pulverized material.

Another object of the present invention is to provide an improved apparatus for continuously feeding bulk material from a bin combined with an improved means of lifting the material in the bin so as to prevent compacting of the material to such an extent that feed may be interrupted.

A further object of the present invention is to provide, in a belt feeder, an improved self-aligning conveyor belt assembly.

A still further object of the present invention is to provide an improved regulating or control gate for the chemical to be fed.

Another object of the present invention is to provide an improved means for regulating the feed of material by a feeder for dry material.

Another object of the present invention is to provide an improved apparatus for agitating or upheaving dry material to be continuously fed from a stationary bin.

Heretofore many different types of dry feeders have been used for the feeding of a dry and pulverized material, such as the feeding of dry unslaked lime to a lime slaker for use in water purification, or in the feeding of various dry ingredients to a common body for mixing the same together, and the like. One general type of such feeders consists of the gravity discharge of such material from a bin onto a supporting surface and the periodical scraping of measured amounts of material from this surface. A second general type comprises a gravity feeding from a bin onto a moving belt and controlling the amount so discharged by various means and from different controlling factors. My invention relates to the latter type of feeder and constitutes certain improvements thereon.

One of my improvements relates to an improved mechanism for the lifting or upheaving of material in the bin so as to maintain a steady gravity discharge therefrom. It is well known that certain materials, such as unslaked lime, have a tendency to compact in the bin, so much so in fact that they often "arch," which is forming of an "arch" across the discharge spout, even though it be quite large. This completely prevents feed to the lower measuring and distributing apparatus so that the feeder is inoperative. In the past it has been customary to avoid this difficulty by attaching vibrators to the bin, by putting mechanical stirrers in the bin, or other means of agitating or disturbing the material in the bin so as to prevent such compacting. One of the primary objects of my invention is to provide a simple and rugged mechanism for upheaving the material in the bin to thereby avoid such compacting or clogging. This result is achieved by providing a belt conveyor mounted below the discharge spout of the bin, such belt conveyor being carried on a frame one end of which is mounted in such a manner as to provide for vertical reciprocation of that end of the conveyor, thereby providing a lifting or upheaving effect upon the material in the bin.

Another of the advantages of my feeder lies in providing a conveyor belt assembly which provides for self-aligning of the conveyor belt. One of the disadvantages of belt feeders has been the fact that the conveyor belt is often quite short and normally has a tendency to run unevenly. This tendency is perhaps partly due to the fact that such belt conveyors must be quite tight in order to provide the necessary friction with the supporting pulleys and such tightness in a short belt will result in greater tension on one side than another with consequent side-slipping of the belt. I have found that, by interposing a plurality of V-belts between the pulleys and the conveyor belt, a lighter and more flexible belt can be used and the tendency of the belt to sideslip is avoided.

Still another advantage of my feeder lies in improved gates controlling the feed of material to the belt. In the preferred form of my invention, I use a pair of gates which lie parallel to the feeder belt and which open laterally, perpendicular to the axis of feed on the belt. Such construction avoids some of the tendency to clog, when the feeder is used with lumpy material, found in feeders using the vertically moving gates which are common in the art. Another advantage in this type of gate lies in the fact that the gate normally carries the major portion of the thrust resulting from the upheaving of material in the bin, rather than letting it be carried upon the conveyor belt which preferably is of light construction such as rubber. As will be more fully understood hereafter, the degree of thrust carried by the gate is inversely proportional to the size of the opening so that at a wide open position the greater portion of the thrust from the material in the bin would be carried on the V-belt underlying it. However such feeders are normally designed so that the gates will be relatively close under normal operating conditions, and in this circumstance the major portion of the thrust is carried by the gate rather than the belt.

These and other advantages will be apparent to those skilled in the art from the description and claims which follow.

Briefly the apparatus of my invention comprises a bin having an outlet from the lower part thereof, a belt conveyor for moving material laterally from below the outlet, the conveyor being mounted on a reciprocating means for raising and lowering the conveyor with respect to said outlet, a prime mover for driving the conveyor and the reciprocating means, and an adjustable gate for varying the amount of material delivered to or by the conveyor.

Preferred embodiments of the present invention are shown in the accompanying drawings, which form a part of this specification and in which like reference characters in the several figures designate similar elements.

Figure 1 is a side view, on a reduced scale, of the outside of a feeder, including the cover or dust-proof hood.

Figure 2 is a plan view at the horizontal plane indicated by the line 2—2 on Figure 3.

Figure 3 is a side view of the apparatus shown in Figure 2, with the cover partially removed.

Figure 4 is a front end view of the apparatus shown in Figure 2 taken at the vertical plane indicated by the line 4—4 of Figure 3.

Figure 5 is a vertical, cross-sectional view, of the rear drive shaft, of the embodiment shown in Figure 2, taken at the vertical plane indicated by the line 5—5 of Figure 3.

Figure 6 is a side view, partly in cross-section, of another embodiment of my invention.

As shown in Figure 1 the feeder apparatus of my invention is designed to be interposed below a stationary storage bin, 11, and above a container in which the dry material is to be delivered, such as lime slaker, 12. The feeder can be supported by any suitable means such as a table, 13, which can also be the cover of the receiving bin, 12. The feeder may be enclosed in any suitable cover, 14, of any desired shape or size. In the drawings the cover, 14, comprises a rear wall, 15, curved side wall, 16, and top, 17. For ready access to the feeder and particularly to the adjusting mechanism, I provide a door, 18, preferably containing a pane of transparent material, 19. The feeder is driven by a motor, 20, which is preferably placed outside of the cover, 14, in order to prevent damage thereto from dust which may accumulate within the cover, 14.

The belt feeder mechanism of my invention is preferably mounted in a frame comprising side pieces, 25 and 26 (as shown particularly in Figures 4 and 5), rigidly fastened to a cross bar, 24. Parallel shafts, 27 and 28, are suitably journaled adjacent the ends of the frame, the front shaft, 27, being journaled, as shown, in bearings, 29 and 30, carried by the side pieces, 25 and 26, respectively, and the rear shaft, 28, being journaled in bearings 31 and 32 carried by side walls 25 and 26 respectively. Ordinarily in belt feeders the conveyor belt is mounted on large rollers or pulleys, which in turn are mounted on the respective shafts. This type of construction can, of course, be used in my invention but I prefer a conveyor belt assembly in which the conveyor belt, 33, is carried by a plurality of V-belts, such as 34, 35 and 36, which in turn are carried by V-belt pulleys, 37, 38 and 39, mounted on the front shaft, 27, and V-belt pulleys, 40, 41 and 42, mounted on the rear shaft, 28. It has long been known that such conveyor belts, when running on pulleys spaced only a short distance apart, as is common in dry feeders, have a tendency to run crooked or side slip, probably due to the varying tensions across the width of the belt. This characteristic can be avoided by my assembly, as V-belts being narrow and carried by V-belt pulleys have no such tendency and the conveyor belt, 33, as it rides upon the respective V-belt may be looser and therefore subject to less internal tension stresses. The V-belt pulleys can be rigidly keyed or otherwise secured to the respective shafts, 27 and 28, by any suitable means, such as by set screws. Mounted on the inner sides of the frame, 25 and 26 respectively, I prefer to place supports, 43 and 44, to carry the edges of the top flight of the conveyor belt, 33.

A hopper, 50, is rigidly mounted on the frame for the belt feeder and extends upwardly from the top flight of the conveyor belt, 33, up to and around the discharge outlet, 51, of the stationary bin, 11. The hopper, 50, should be somewhat larger than the outlet spout, 51, so that the hopper is movable relative to the bin. I prefer to provide a flexible sealing means between the hopper, 50, and the bin, 11, and have found that a suitable seal may be a piece of canvas secured to the inner wall of the spout, 51, and hanging loosely down into the hopper, 50, as shown in Figure 3. Such a seal permits relative motion between the hopper, 50, and the spout, 51, and at the same time prevents leakage of powdery material out of the top of the hopper, 50.

Suitably mounted in the hopper, 50, can be a feed control gate of any suitable construction. Heretofore it has been customary to construct such a control gate on the front of the hopper and for vertical movement therein, so as to vary the depth of feed on the conveyor belt, 33. While such construction can be used in my feeder, I prefer to use a gate mechanism in which the depth of feed is constant but in which the width of the stream deposited on the conveyor is adjustable. In my preferred form, the control mechanism comprises a pair of horizontal gates, 53 and 54, mounted for lateral movement in the hopper, by upper brackets, 55, and lower brackets, 56. I prefer that such gates, 53 and 54, be spaced a short distance above the conveyor belt, 33, and that each be provided with a downwardly extending flange, 57 and 58 respectively, extending down to immediately adjacent the surface of the conveyor belt, 33. Such construction provides a stream of material of constant depth and of variable width, and has the decided advantage of being non-clogging. I prefer that the gates be operated in unison and in parallel, and in my preferred form provide threaded shafts, 59 and 60, at the front and rear end of the feeder mechanism—the front shaft, 59, being journaled in suitable bearings, 61 and 62, and the rear shaft, 60, being journaled in other suitable bearings, 63 and 64. It will be understood that one end of each of the threaded shafts, 59 and 60, have right-hand threads while the other end will have left-hand threads, so that when the shafts are rotated nuts on each end of the shaft will either approach or move away from a central point in unison. Affixed to the gates and mounted on the threaded shafts, 59 and 60, are nuts to provide movement of the gates upon rotation of the shafts, 59 and 60. As shown in Figure 2, nuts 65 and 66 are fixed to gate 53 and are associated with shafts 59 and 60, respectively, and nuts 67 and 68 likewise associated with shafts 59 and 60, respectively, are affixed to gate 54. The two shafts, 59 and 60, are rotated in unison by any suitable means such as a drive shaft, 69, which can be rotated by any suitable means, such as a handwheel, 70. Miter gears, 71 and 72, rigidly keyed to the drive shaft, 69, mesh with corresponding miter gears, 73 and 74, keyed to front and rear shafts, 59 and 60, respectively. It is obvious that as the handwheel, 70, is rotated in one direction the gates, 53 and 54, will be moved outwardly from a central position and as it is rotated in the opposite direction they will approach a central position. It will be obvious also that when the gates are in contact there will be no feed of chemical to the belt feeder and that as the gates are opened to their utmost extension there will be a gradual increase in the amount of material fed to a predetermined maximum. For purposes of ease in regulating the supply of chemicals, I prefer to mount a pointer, 75, on one of the nuts, such as 67, and to provide a graduated scale, 76, associated therewith. It will be obvious to those skilled in the art that in place of the handwheel, 70, for regulating the positioning of the gates, 53 and 54, any automatic means can be used, which means can be controlled by any suitable condition, such as the weight of the material delivered, or the amount of material to be treated, such as by controlling the feed from a feeder by the size of a variable flow of liquid to be dosed by a treating chemical, or the like. Such automatic control in itself is not new and is not claimed herein, but will be obvious to those skilled in the art.

As indicated heretofore, one of the objects of my invention is to provide a belt feeder in which the material in the bin, 11, can be lifted or upheaved in a simple manner whereby I am enabled to discard the cumbersome stirring and shaking devices heretofore used. One embodiment of such an upheaving mechanism is shown in Figures 2 to 5 inclusive. As shown particularly in Figure 3, one end of the frame, such as the front end, is suspended from any suitable means such as the top, 17, of the cover, 14, such as by a link, 80. In this embodiment the other end of the frame is supported upon eccentric end portions, 81 and 82, of the rear shaft, 28, of the conveyor belt assembly. Thus, in the drawings, the rear shaft, 28, which is preferably the drive shaft in this embodiment, has the eccentric end portions 81 and 82, journaled in fixed bearings. One end portion 81, can be journaled in a bearing, 83, affixed to the feeder support, 13, and the other eccentric portion, 82, can be journaled in a suitable bearing, such as 84, mounted in a gear box, 85. Thus as the shaft, 28, is rotated, the eccentric portions, 81 and 82, which are projections of each other, rotate in the fixed bearings, 83 and 84. The other portion of the shaft, carrying the side pieces, 25 and 26, and the V-belt pulleys, 40, 41 and 42, will thus have a vertical reciprocatory motion, which motion will be transmitted to the entire feeder assembly including the hopper, 50, and the conveyor belt, 33, and the feed control gates, 53 and 54. Such vertical reciprocation imparts a lifting or upheaving to the material in the bin, 11. The gate construction heretofore described has the added advantage of carrying a portion of the thrust of such upheaving action inversely proportional to the size of the opening between the gates (normally the gates will carry the major portion of the thrust as it is expected that under normal operating conditions the opening provided by the gates will be relatively small), thereby permitting the use of a lighter and more flexible conveyor belt, 33. The lifting or upheaving action so secured prevents compacting of the material in the bin, 11, and thereby provides for continuous flow of material to the conveyor belt, 33.

The whole feeder can be driven by a single motor, 20. A belt, 90, connects a small pulley, 91, mounted on the rotor of the motor, 20, with a pulley, 92, carried by a gear reducer, 94. Preferably the pulley, 92, will be outside of the cover, 14, so that it may be changed readily if desired in order to vary the speed at which the conveyor belt, 33, travels, thereby controlling the maximum amount of material to be fed by the feeder. The speed reducer, 94, of known construction, reduces the angular velocity of the inlet shaft, 93, of the gear reducer to run the outlet shaft, 95, of the reducer at a predetermined speed. A worm gear, 96, on the outlet shaft, 95, drives a pinion, 97, rigidly keyed to the shaft, 28, of the feeder mechanism.

In operation, the motor, 20, through the medium of the gearing shown, drives the eccentric shaft, 28, one portion of which is carried by fixed bearings and the other portion of which carries the frame and pulleys of the belt feeder. As this shaft rotates, one end of the feeding mechanism comprising the framework, conveyor belt, feed control gates, 53 and 54, and hopper, 50, will reciprocate vertically with respect to the fixed bin, 11. This action lifts or upheaves the material, not only in the hopper but likewise in the bin itself. The bin, 11, is, of course, stationary and material therein is apt to compact and prevent gravity flow of the material therefrom. This tendency is prevented by lifting the hopper, 50, in respect to the bin, 11, so that the material in the hopper lifts the material within the bin. The material from the bin, 11, continuously agitated in this manner, feeds by gravity down into hopper, 50, thence through the opening between the gates, 53 and 54, and is discharged in a stream of constant thickness but of varyng and controlled width, onto the conveyor belt, 33, and carried thereby to some suitable point for discharge into the receptacle for use. Thus I am enabled to secure a constant feed of accurately controlled amount of material from a fixed, or stationary storage bin, the amount of such feed being controllable over wide limits and with great accuracy.

Figure 6 illustrates a more complicated and therefore to some extent less desirable actuating mechanism. In this embodiment the hopper and conveyor belt assembly are the same as in the other figures except that in this case the shafts, 27 and 28a, are ordinary cylindrical shafts, each mounted in the conveyor frame, and neither is eccentric. In this embodiment the shaft at one end, 27, as shown in the drawing, is mounted in bearings rigidly carried by the feeder supports, such as being mounted in gear boxes, 110 and 111, as shown. It will be understood that the gear boxes 110 and 111 are at opposite sides of the feeder belt, the gear box 110 being on the near side of the apparatus and the gear box 111 being on the far side. Each gear box carries a suitable bearing in which an end of the shaft 27 is journaled, and also contains part of the gearing necessary to secure a suitable speed reduction for driving the conveyor belt and for operating the reciprocating mechanism. The shaft, 27, is driven by any suitable means such as a gear, 112, which meshes with a pinion, 113, mounted on a third shaft, 114. A second gear, 115, mounted on the third shaft, 114, is driven by a second pinion, 116, mounted on a fourth shaft, 117. A drive pulley, 118, also mounted on the latter shaft, 117, is connected to the motor, 29, by a belt, 119. In the embodiment shown in Figure 6 the three shafts 27, 114 and 117 have one end journaled in the gear box 110 and the other end journaled in suitable bearings in gear box 111 so that they extend from one side of the belt to the other. The purpose of such gearing is primarily to provide a suitable speed reducer so that the belt will travel at some predetermined slow speed. Such gearing can also be utilized to drive a reciprocating mechanism which lifts one end of the belt conveyor with respect to the bin. Many suitable devices could be suggested by those skilled in the art but I show a simple form in this figure. An eccentric, 120, which will be understood to include similar devices, such as cams or cranks, is keyed to the third shaft, 114. A connecting rod, 121, is joined to a bell crank, 122, as by a pin, 123, and also to the eccentric, 120, as by eccentric strap, 120a. The bell crank, 122, rocks on a bell crank shaft, 124, journaled in any suitable bearing, such as 125. A link, 126, is pivotally connected to the free end of the bell crank, 122, as by pin, 127, and to the free end of the conveyor frame as by pin, 128. In this construction it will be obvious that when the motor is operated, it, through the gearing shown, will drive shaft, 27, thereby driving the conveyor belt, 33, and also the eccentric, 120. As the eccentric rotates it rocks the bell crank, 122, and thus vertically reciprocates the free end of the conveyor frame. This vertical reciprocation provides the necessary lifting or feeding to prevent compacting of the material in the bin, 11.

The operation of the apparatus of Figure 6 will be similar to that of the other figures, except as indicated.

Manifestly many modifications and variations of the invention hereinbefore set forth may be made by persons skilled in the art without departing from the spirit and scope thereof.

I claim:

1. In a material feeding device including a stationary bin, an outlet from the bottom of said bin, a belt conveyor mounted below said outlet, and a prime mover operatively connected to said belt conveyor, the combination with said belt conveyor of means for continuously reciprocating the belt conveyor through a predetermined path while in operation, said means comprising an eccentric supporting member supporting one end of said belt conveyor, said eccentric supporting member being operatively connected to said prime mover.

2. In a material feeding device including a stationary bin, an outlet from the bottom of said bin, a conveyor frame mounted below said outlet, parallel shafts mounted in said frame, pulleys mounted on said shafts, and a conveyor belt riding on said pulleys, the combination which comprises an eccentric on one of said shafts, said eccentric being mounted on bearings rigidly spaced with respect to said outlet, whereby, on operation of said belt and pulleys, one end of said frame is continuously reciprocated vertically with respect to said outlet.

3. A feeder for continuously delivering dry pulverized material from a bin having a downwardly opening outlet from the lower part thereof comprising a belt conveyor immediately below said outlet and adapted to continuously move material laterally away from said outlet, a reciprocating mechanism including an eccentric member supporting one end of said belt conveyor and so constructed and arranged as to positively and continuously raise and lower such end of the belt conveyor through a fixed and predetermined path with respect to said outlet, a prime mover operatively connected to said belt conveyor and said reciprocating mechanism, and an adjustable gate for varying the amount of material delivered by said belt conveyor.

4. Material feeding apparatus comprising a stationary bin having a downwardly opening outlet, a conveyor belt mounted beneath the outlet of the bin, pulleys supporting said conveyor belt, a mechanical reciprocating means including an eccentric member supporting at least one of said pulleys and operable to continuously reciprocate such pulley through a predetermined path, a prime mover operatively connected to said conveyor belt and to said reciprocating means, a hopper associated with said conveyor belt and reciprocable therewith and receiving material from said outlet and discharging the same onto said conveyor, a gate in said hopper and means to move said gate.

5. The apparatus of claim 4 wherein the eccentric member comprises an eccentric shaft on which such pulley is mounted.

6. The apparatus of claim 4 wherein the eccentric member comprises an eccentric plate mounted on a rotatable shaft, and a linkage supporting said pulley and operatively connected to said eccentric plate.

7. A material feeding apparatus comprising a stationary bin, a downwardly opening outlet from the lower part of said bin, a conveyor frame mounted below said outlet, an eccentric mechanism supporting one end of said frame and so constructed and arranged as to vertically reciprocate said end of said frame, a conveyor belt mounted on said frame, a hopper mounted on said frame, said hopper receiving material from said outlet and discharging the same to said conveyor belt, an adjustable gate in said hopper, and means including a prime mover for driving said conveyor belt and for operating said eccentric mechanism.

8. A material feeding apparatus comprising a stationary bin, a downwardly opening discharge spout from the lower part of said bin, a conveyor frame mounted below said spout, one end of said frame being supported by a reciprocating mechanism including an eccentric and so constructed and arranged as to positively reciprocate' said end vertically with respect to said bin, pulleys mounted in said frame, a conveyor belt mounted on said pulleys, a hopper mounted on said frame, said hopper extending upwardly around said discharge spout and down to said conveyor belt, an adjustable horizontal gate in said hopper for regulating the width of discharge to said conveyor belt, and means including a prime mover for driving said conveyor belt and for operating said reciprocating mechanism.

9. A material feeding apparatus comprising a stationary bin, a downwardly opening outlet from the lower part of said bin, a conveyor frame mounted below said outlet, one end of said frame being movably mounted with respect to said bin, a mechanism including an eccentric for vertically reciprocating said movably mounted end of said frame, a conveyor belt mounted on said frame, a hopper mounted on said frame, said hopper receiving material from said outlet and discharging the same onto said conveyor belt, horizontal gates in said hopper adjacent said conveyor belt, means for laterally moving said gates, and means including a prime mover for driving said conveyor belt and for operating said reciprocating mechanism.

10. A material feeding device comprising a stationary bin, a downwardly opening outlet from the bottom of said bin, a conveyor frame mounted below said outlet, an eccentric shaft rigidly mounted with respect to said bin, one end of said frame being mounted upon the eccentric portion of said shaft, means supporting the other end of said frame in spaced relationship to said bin, a second shaft in the other end of said frame, pulleys on said shafts, a conveyor belt mounted on said pulleys, a hopper mounted on said frame receiving material from the outlet of said bin and discharging the same on said conveyor belt, an adjustable gate in said hopper, means to position said gate, and a prime mover operatively connected to said eccentric shaft, thereby driving the conveyor belt and reciprocating one end of said frame vertically with respect to said bin.

11. A material feeding device comprising a stationary bin, a downwardly opening outlet from the lower part of said bin, a conveyor frame mounted beneath said outlet, parallel shafts mounted in the ends of said frame, the shaft at one end of said frame being also journaled in bearings fixedly supported with respect to said bin, the other end of said frame being linked to an eccentric mounted on a third shaft, a conveyor belt mounted on said parallel shafts, a hopper mounted on said frame receiving material from the gravity discharge of said bin and delivering the same to said conveyor belt, an adjustable gate in said hopper, means for positioning said gate, and a prime mover operatively connected to said shafts.

WALTER J. HUGHES.

REFERENCES CITED

The following references are of record in the file of this patent:

UNITED STATES PATENTS

| Number | Name | Date |
| --- | --- | --- |
| 447,072 | Huntley | Feb. 24, 1891 |
| 579,683 | Romine | Mar. 30, 1897 |
| 711,306 | Good | Oct. 14, 1902 |
| 778,113 | Clarke | Dec. 20, 1904 |
| 843,018 | Jamieson | Feb. 5, 1907 |
| 1,234,532 | Dickerson | July 24, 1917 |
| 1,555,886 | Snyder | Oct. 6, 1925 |
| 1,656,628 | Gits | Jan. 17, 1928 |
| 1,777,670 | Hausman | Oct. 7, 1930 |
| 1,861,443 | Holzapfel | June 7, 1932 |
| 1,868,404 | Zeigler | July 19, 1932 |
| 1,883,017 | Sholtz | Oct. 18, 1932 |
| 1,908,238 | Hardinge | May 9, 1933 |
| 2,010,220 | Cocks | Aug. 6, 1935 |
| 2,048,124 | Hume | July 21, 1936 |
| 2,067,400 | Koplin | Jan. 12, 1937 |
| 2,100,316 | Harper | Nov. 30, 1937 |
| 2,344,040 | Hoke | Mar. 14, 1944 |
| 2,347,964 | Otto | May 2, 1944 |

FOREIGN PATENTS

| Number | Country | Date |
| --- | --- | --- |
| 233,297 | Germany | Nov. 19, 1909 |